United States Patent [19]

Murphy

[11] 4,329,166
[45] May 11, 1982

[54] AUTOMATIC TIPPING-OFF APPARATUS FOR A HIGH-INTENSITY-DISCHARGE ARC TUBE

[75] Inventor: John J. Murphy, Livingston, N.J.

[73] Assignee: Westinghouse Electric Corp., Pittsburgh, Pa.

[21] Appl. No.: 219,696

[22] Filed: Dec. 24, 1980

[51] Int. Cl.³ ................... C03B 23/13; C03B 23/18
[52] U.S. Cl. ........................... 65/270; 53/79; 65/272; 65/284
[58] Field of Search ............... 65/270, 272, 284, 34; 53/405, 408, 79

[56] References Cited

U.S. PATENT DOCUMENTS

| | | | |
|---|---|---|---|
| 2,197,527 | 4/1940 | Madden | 65/270 X |
| 2,295,034 | 9/1942 | Geiger et al. | 65/34 |
| 2,403,073 | 7/1946 | Geiger et al. | 53/408 |
| 2,496,303 | 2/1950 | Morse et al. | 65/34 X |
| 2,604,732 | 7/1952 | Bocast | 65/270 |
| 2,764,857 | 10/1956 | Schaefer | 53/408 |
| 2,983,078 | 5/1961 | Mistler et al. | 65/34 X |
| 3,188,778 | 6/1965 | Wiener et al. | 53/79 X |

Primary Examiner—Richard V. Fisher
Attorney, Agent, or Firm—R. S. Lombard

[57] ABSTRACT

An automatic tipping-off apparatus for hermetically sealing the exhaust tubulation of a dosed and otherwise processed arc tube for a high-intensity-dicharge device. The apparatus for use with an arc tube fabricating machine including a rotatable turret having a plurality of arc tube holding members mounted about the peripheral portion thereof. The turret is operational to move the arc tube holding members in a sequential stop-and-go fashion to and from a plurality of operating stations located in close proximity to the turret. The tipping-off apparatus maintains the arc tube in a vertical orientation and utilizes spring-loaded jaws to retain the arc tube while a burner moves into position about the exhaust tubulation. A timing means controls the movement of the jaws and burner to provide a controlled draw of the tubulation to provide a uniform thickness for the tip portion of the finished arc tube and to effect a fire polishing thereof, the apparatus being designed to be compatible with a high-speed arc tube fabricating machine.

5 Claims, 15 Drawing Figures

AUTOMATIC TIPPING-OFF APPARATUS FOR A HIGH-INTENSITY-DISCHARGE ARC TUBE

CROSS-REFERENCE TO RELATED APPLICATIONS

In copending application Ser. No. 219,695, filed concurrently herewith by the present applicant and others, and assigned to the present assignee there is described an integral machine for making substantially contaminant-free high-intensity discharge arc tubes. The machine uses the heat from the pressing operation to aid in the evacuation and filling of the arc tube.

In copending application Ser. No. 219,713, filed concurrently herewith by present applicant and L. D. Estrada and assigned to the present assignee, there is described a rotatable turret having a constant index time and a variable dwell time. The turret is used for the production of worked pieces.

In copending application Ser. No. 219,693, filed concurrently herewith by P. Fix and K. Collins and assigned to the present assignee, there is described an apparatus for press sealing a tubular quartz body portion about a ribbon-type metallic seal. The press sealing apparatus utilizes a burner that deforms the tubular quartz body portion in such a manner to provide sufficient quartz for the press seal.

In copending application Ser. No. 219,712, filed concurrently herewith by J. Petro and assigned to the present assignee, there is described a machine parts protecting system for protecting those parts of a machine that may be in close proximity to high temperature flames.

BACKGROUND OF THE INVENTION

This invention relates generally to apparatus for producing high-intensity-discharge arc tubes and, in particular, to an apparatus for automatically tipping-off such an arc tube.

A number of methods and apparatus for the tipping-off hermetically sealed vitreous bodies such as lamps, radio tubes and other electrical devices having vitreous envelopes provided with exhaust tubes which are sealed or tipped-off after the envelope has been evacuated, have been described. One such apparatus is in U.S. Pat. No. 2,496,303, dated Feb. 7, 1950, issued to R. O. Morse et al. The Morse patent discloses a method of tipping-off an exhaust tube which entails coating the portion of the exhaust tube closest to the vitreous envelope with graphite at the point where the tip is to be trimmed after tipping-off to avoid undue heating of the envelope. A circumferential cut is made at the trim point and the remaining exhaust tubulation is broken off. The graphite also aids in preventing glass from coating any lead-in wire that it is to extend beyond the tip-off.

In U.S. Pat. No. 2,983,078, dated May 9, 1961, issued to G. R. Mistler et al. is disclosed a method of sealing a vitreous conduit such as an incandescent-type lamp having an exhaust tubulation. The method entails preheating the tubulation in the area next to a heat sealing member. A spring urges the sealing member in a clockwise direction causing the member to effect considerable stress on the heated tubulation and the temperature of the tubulation is such that the stress applied by the heat sealing member causes a substantial deformation of the tubulation and permits the heat sealing member to pass through the tubulation thereby effecting the seal.

In U.S. Pat. No. 2,764,857, dated Oct. 2, 1956, issued to G. F. Schaefer is disclosed a method of tipping-off an exhaust tubulation which method entails heating the tubulation at the point desired for the end of the tip-off with a pointed gas flame to effect the tip-off.

In U.S. Pat. No. 3,188,788, dated June 15, 1965, issued to C. Wiener et al. is disclosed a tipping-off apparatus compatible with an automatic exhaust machine. The tipping-off apparatus includes means for holding the arc tube in predetermined alignment relative to a striker arm. An annular tipping-off burner substantially encircles the exhaust tubulation at a predetermined point. The burner heats the tubulation and then the striker arm is activated thereby effecting the tip-off.

It has been found that the tip-off apparatus of the prior art does not readily adapt to high-speed automatic arc tube fabricating machinery.

SUMMARY OF THE INVENTION

The present invention overcomes the problems of the prior art by providing a reliable automatic tip-off apparatus which permits arc tubes to be processed at a high rate. The present invention accepts arc tubes in the vertical orientation and, therefore, does not require complex apparatus to change the orientation of the arc tube for tipping-off.

This invention provides a tipping-off apparatus for hermetically sealing the exhaust tube portion of a dosed and otherwise processed arc tube for a high-intensity-discharge device. The tipping-off apparatus comprises a portion of a fabricating apparatus for the arc tubes. The fabricating apparatus includes a plurality of arc tube holding members each mounted about the peripheral portion of a turret member. The arc tube holding members are sequentially indexable in a stop-and-go fashion to and from a plurality of operating stations located about the periphery of the turret. The arc tube just prior to being tipped-off comprises an elongated tubular body having electrodes operatively positioned proximate the sealed ends thereof with a predetermined discharge-sustaining filling contained within the arc tube body. The arc tube body has an elongated exhaust tubulation projecting laterally therefrom and opening into the interior thereof as is well known in the art.

The tipping-off apparatus is positioned at one of the operating stations and each arc tube upon being indexed into the tipping-off operating station is retained on the turret by its exhaust tubulation with the arc tube body retained in a vertical orientation and with the atmosphere within the arc tube and the tubulation being a small charge of inert ionizable starting gas.

The tipping-off apparatus comprises spring-loaded jaw means movable into retaining position on opposite sides of the arc tube. The spring loading on each of the jaw means being slightly different so that absent the retention of the arc tube by its exhaust tubulation, the arc tube would be moved a predetermined distance by the jaw means. Tipping-off apparatus also comprises burner means movable into position about the tubulation of the arc tube and operable to heat the tubulation to a softened status at a location proximate the body of the arc tube, and when the tubulation has been sufficiently softened by the heating from the burner means, the spring loading on the jaw means acts to move the arc tube a predetermined distance with respect to the retained tubulation to effect a preliminary severing of the tubulation.

The tip-off apparatus further comprises timing means for controlling the movement of the jaw means and the burner means upon the arc tube being indexed to the tipping-off station. Jaw and burner moving means is provided operable by the timing means for moving the jaws and the burner from the remainder of the retained exhaust tubulation to effect a complete severing thereof. The burner means continues to heat the severed tip of the tubulation proximate the arc tube body to effect the fire polishing thereof. The jaw and burner moving means is then operable to open the jaws and to release the now sealed arc tube.

BRIEF DESCRIPTION OF THE DRAWINGS

For a better understanding of the invention reference may be had to the accompanying drawings, exemplary of the invention, in which.

BRIEF DESCRIPTION OF THE PREFERRED EMBODIMENTS

Figure 6:
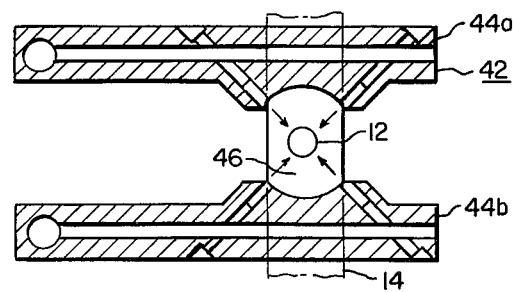
FIG. 6 is a cross-sectional elevational view of the burner means showing the position of an arc tube relative thereto.
Figure 1:
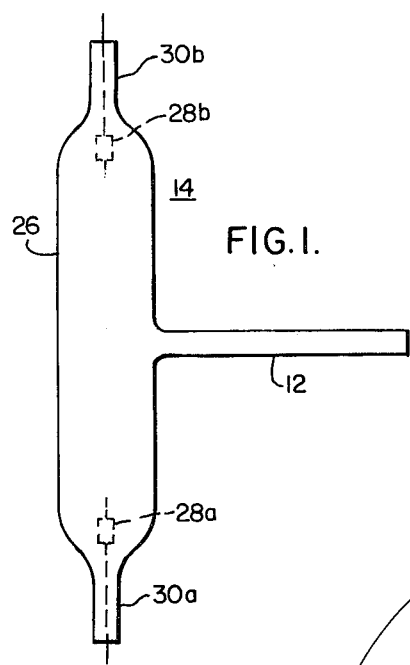
FIG. 1 is an elevational view of an arc tube prior to tip-off.

Referring to FIGS. 1-8, there is provided a tipping-off apparatus 10 for hermetically sealing the exhaust tubulation 12 of a dosed and otherwise processed arc tube 14 high-intensity-discharge device, such as a mercury vapor lamp. The tipping-off apparatus 10 comprises a portion of a fabricating apparatus 16 for the arc tubes 14. Fabricating apparatus 16 includes a plurality of arc tube holding members 18 each mounted about the peripheral portion 20 of a turret member 22. The arc tube holding members 18 are sequentially indexable in a stop-and-go fashion to and from a plurality of operating stations 24 located about the periphery of the turret 22 as is well known in the art. The arc tube 14 just prior to being tipped-off comprises an elongated tubular body 26 having electrodes 28a, 28b operatively positioned proximate the sealed ends 30a, 30b with a predetermined discharge-sustaining filling such as mercury contained within the arc tube body 26. The arc tube body is typically made of quartz or other vitreous material and has an elongated exhaust tubulation 12 projecting laterally therefrom and opening into the interior of the arc tube body 26.

Figure 2:
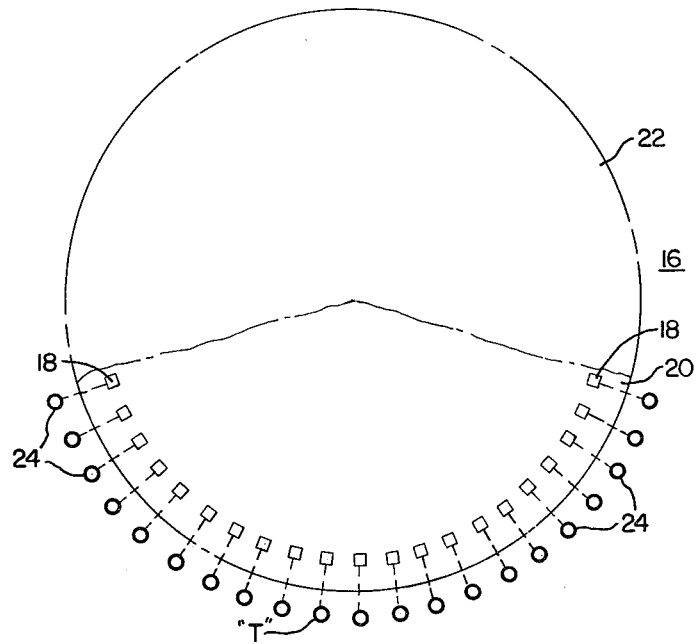
FIG. 2 is a schematic sectional plan view showing a plurality of arc tube holding members mounted at the peripheral portion of a turret member and the location of a plurality of operating stations relative to the turret.
Figure 5:
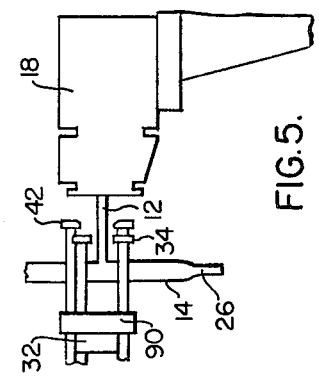
FIG. 5 is a sectional elevational view showing the position of the spring-loaded jaws relative to an arc tube which is being retained by the arc tube holding member.
Figure 4:
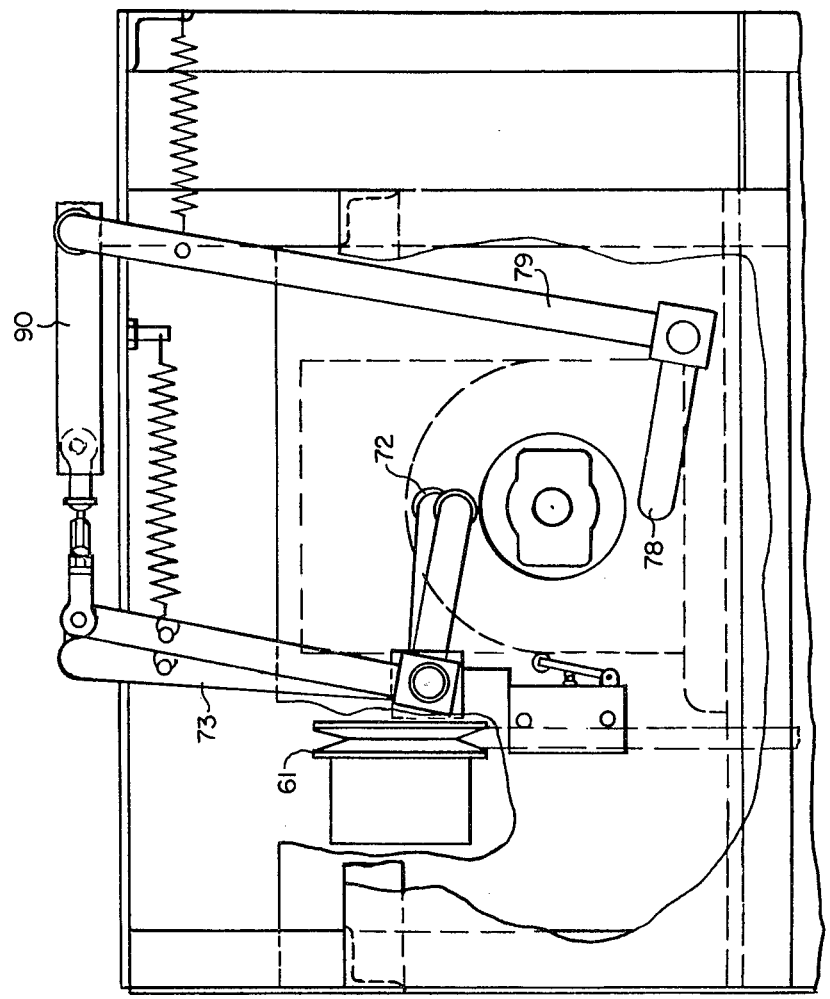
FIG. 4 is a sectional elevational view of the timing means.

The tipping-off apparatus 10 is positioned at one of the operating stations labeled "T" in FIG. 2. Each of the arc tubes 14 upon being indexed to the tipping-off operating station "T" is retained on the turret 22 by its exhaust tubulation 12 with the arc tube body 26 retained in a vertical orientation as shown in FIG. 5. The atmosphere within the arc tube and the tubulation being a small charge of inert ionizable starting gas such as argon.

Figure 3:
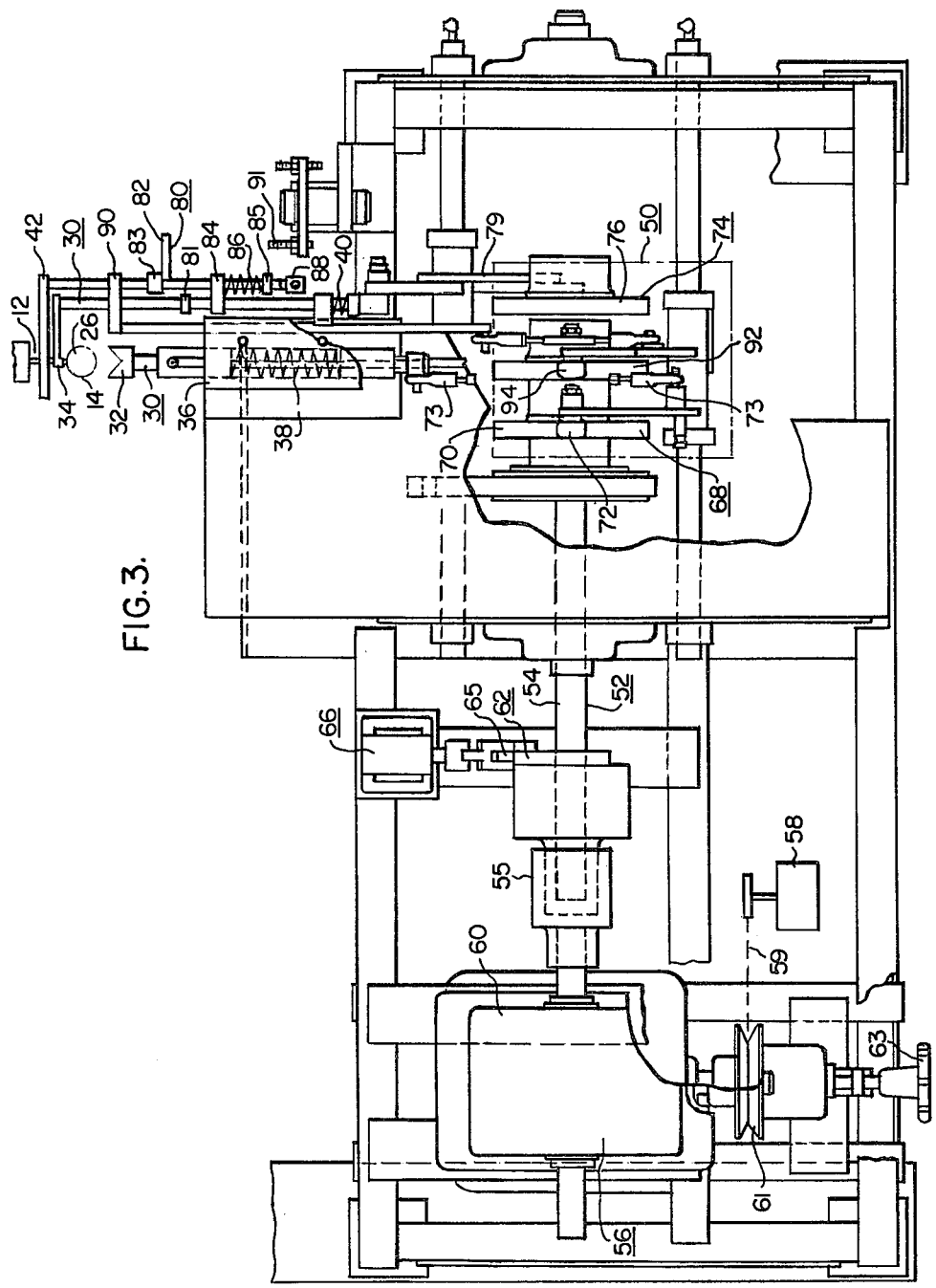
FIG. 3 is a plan view of a tipping-off apparatus, partly in section.

The tipping-off apparatus is shown in FIGS. 3-8 and comprises spring-loaded jaw means 30 movable into retaining position on opposite sides of the arc tube 14. The spring loading on each of the jaw means being slightly different so that absent the retention of the arc tube 14 by its exhaust tubulation 12 the arc tube would be moved a predetermined distance such as 36 millimeters by the jaw means 30. The jaw means preferably comprise a front jaw member 32 which is shown in FIG. 3 as a V-shaped jaw to reliably engage the arc tube 14 on the side opposite the exhaust tubulation 12. A rear jaw member 34 is engageable with the arc tube 14 opposite the front jaw member. As shown in FIG. 3 the front jaw member 32 is slidable within housing 36. A first spring means 38 housed within the housing 36 engages the front jaw 32 for providing a predetermined force such as 1 ounce (28.4 grams) toward the rear jaws 34. Second spring means 40 is engageable with the rear jaw means 34 for providing a predetermined greater force than the force of first spring 38 such as 1.5 ounces (42.6 grams) toward the front jaw 34.

Figure 11:
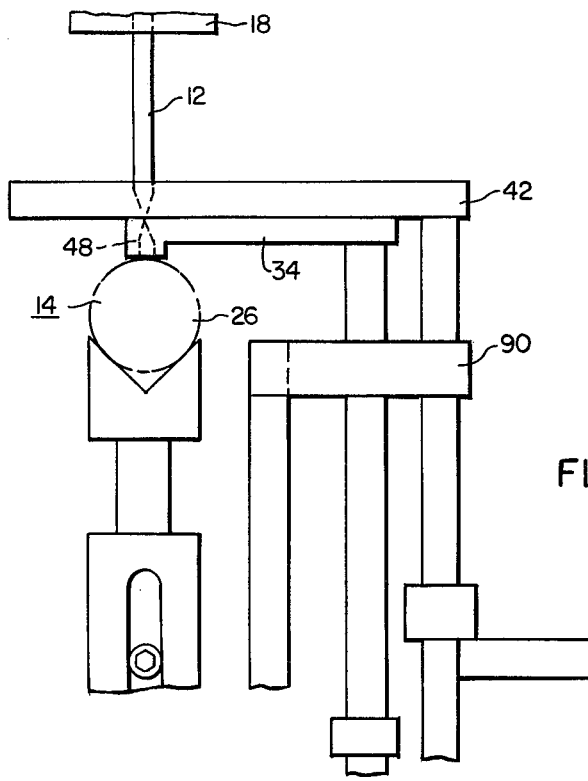
FIG. 11 is an operational schematic plan view showing the position of the jaws and burner during the controlled draw to form the hermetic tip portion.
Figure 12:
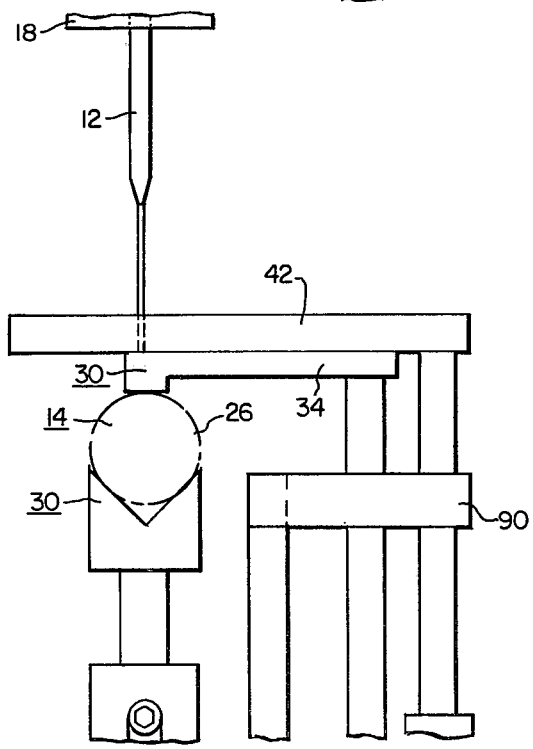
FIG. 12 is an operational schematic plan view showing the position of the jaws and burner just prior to effecting a complete severing of the retained exhaust tubulation.
Figure 13:
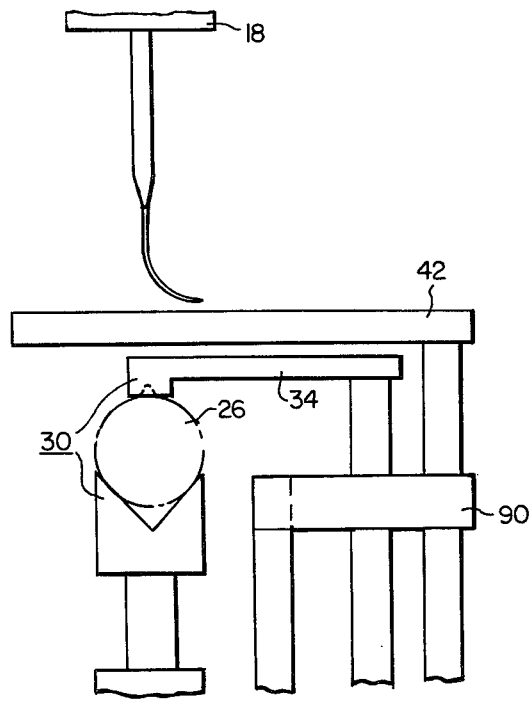
FIG. 13 is an operational schematic plan view showing the position of the jaws and burner at the time of complete severing of the retained exhaust tube and the fire polishing of the tip portion.
Figure 14:
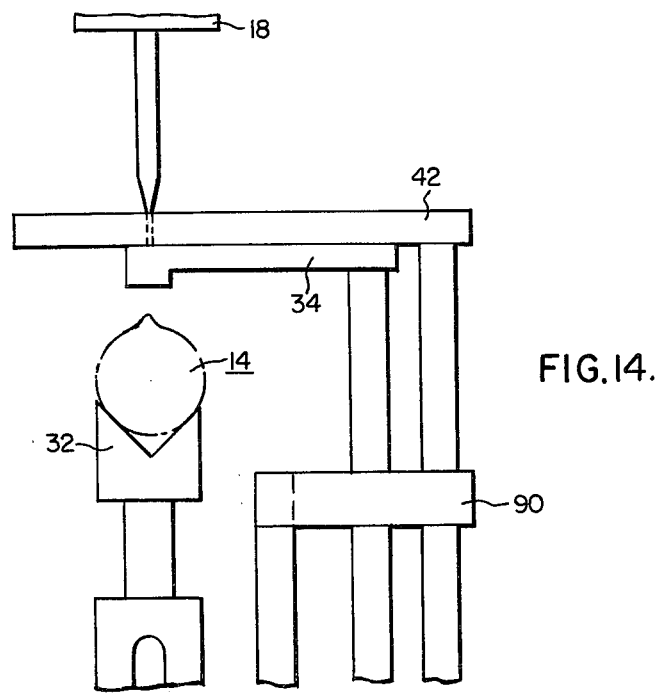
FIG. 14 is an operational schematic plan view showing the position of the jaws and burner when the sealed arc tube is released from the tipping-off apparatus; and, FIG. 15 is a timing chart of the cam means and movement of the burner means.

The tipping-off apparatus 10 further comprises a burner means 42 movable into position about the tubulation 12 of the arc tube 14 and operable to heat the tubulation to a softened status at a location proximate the arc tube body 26. The burner means 42 comprises an upper burner member 44a and a lower burner member 44b as shown in FIG. 6. The burner means 42 has a heating section 46 which as shown in FIG. 6 is designed to direct high temperature flames at the tubulation 12. When the tubulation 12 has been sufficiently softened by the heating from the burner 42, the spring loading on the jaw means 30 acts to move the arc tube 14 a predetermined distance such as 4 millimeters with the respect to the retained tubulation 12 to form a hermetic tip portion 48 of the tubulation 12 shown in FIG. 11.

The tipping-off apparatus 10 also includes timing means 50 for controlling the movement of the jaw means 30 and the burner means 42 upon the arc tube 14 being indexed to the tipping-off station "T". Jaw and burner moving means 52 is provided and is operable by the timing means 50 to move the jaw means and the burner means 42 from the remainder of the retained exhaust tubulation 12 to effect a complete severing of the retained exhaust tubulation 12 from the hermetic tip portion 48. Burner 42 then continues to heat the severed tipped portion 48 of the tubulation 12 proximate the arc tube body 26 to effect a fire polishing thereof. The jaw and burner moving means 52 is then operable to open the jaws 30 to release the now sealed arc tube 14.

Figure 8:
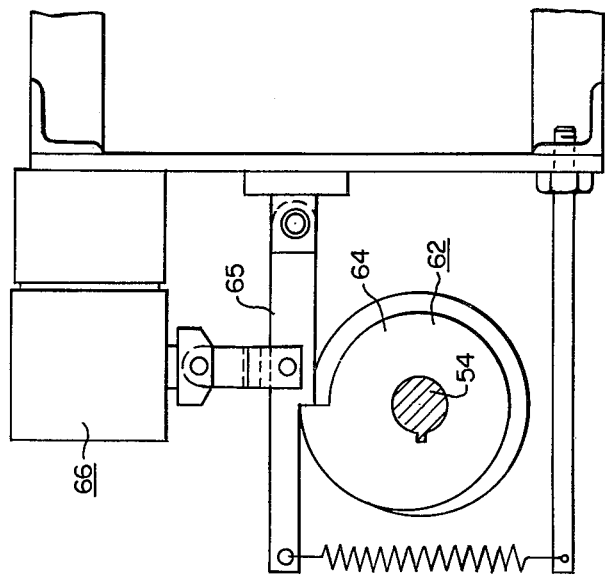
FIG. 8 is an elevational view of the clutch means as shown in FIG. 7.
Figure 7:
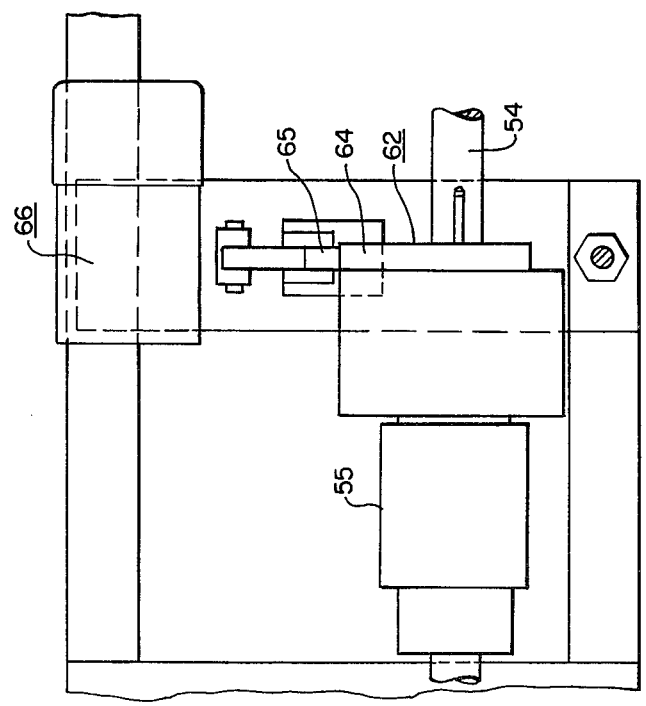
FIG. 7 is an enlarged plan view of the clutch means.

Preferably, the jaw and burner moving means 52 comprise a rotatable camshaft 54 operable to rotate one revolution, with a rotation of the camshaft being initiated when the arc tube 14 is indexed to the tipping-off station "T". Driving means 56 comprises a motor 58, shown schematically in FIG. 3, having an output of 1725 rpm, 230 volts. The output of motor 58 is connected to a 80:1 speed reducer 60 manufactured by Ohio Gear Company, Model No. HU-0 that turns camshaft 54 through coupling 55 at 0.283 revolution per second. The motor 58 is connected by belt 59 to adjustable pulley 61. The diameter of pulley 61 may be changed by hand control 63 thus changing the input speed to the speed reducer 60. Referring to FIGS. 7 and 8, a one-revolution clutch means 62, manufactured by Hilliard Corporation, TYPE 60, 0.750 Bore #2 clockwise rotation, comprises a clutch wheel 64 mounted for rotation on the camshaft 54 and operable to permit the camshaft 54 to turn one revolution between each index of the turret 22. A solenoid activated trip means 66 is engageable with the clutch wheel 64. The trip means 66 normally prevents the rotation of the clutch wheel 64 by holding trip lever 65 until the trip means 66 is energized upon the arc tube being indexed to the tipping-off station "T" thereby disengaging trip lever 65 from clutch wheel 64.

The timing means 50 preferably comprises first cam means 68 comprising a first cam 70, for rotation on the camshaft 54 and a first cam follower 72 engaging the first cam and operable through first arm 73 to move the front jaw 32 inwardly and outwardly from the axis of the turret 22 in predetermined sequence. The timing means also comprises second cam means 74 comprising a second cam 76 mounted for rotation on the camshaft 54 and a second cam follower 78 engaging the second cam 76 and operable through second arm 79 to move the rear jaws 34 inwardly and outwardly from the axis of the turret 22 in a predetermined sequence. Cylinder clamp 84 and rear jaw stop 81 stop the rear jaws 34 during the controlled draw hereinafter discussed.

Figure 9:
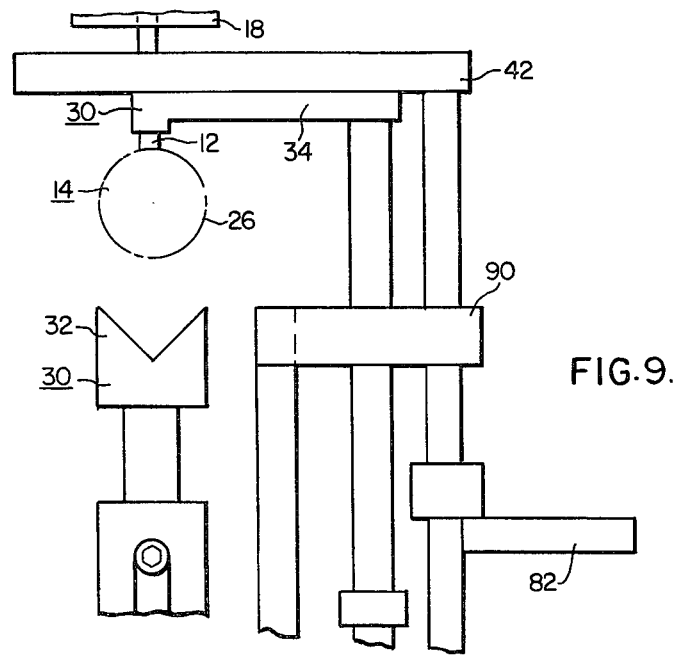
FIG. 9 is an operational schematic plan view showing the position of the jaws and burner relative to an arc tube that has just been indexed to the tip-off operating station.
Figure 10:
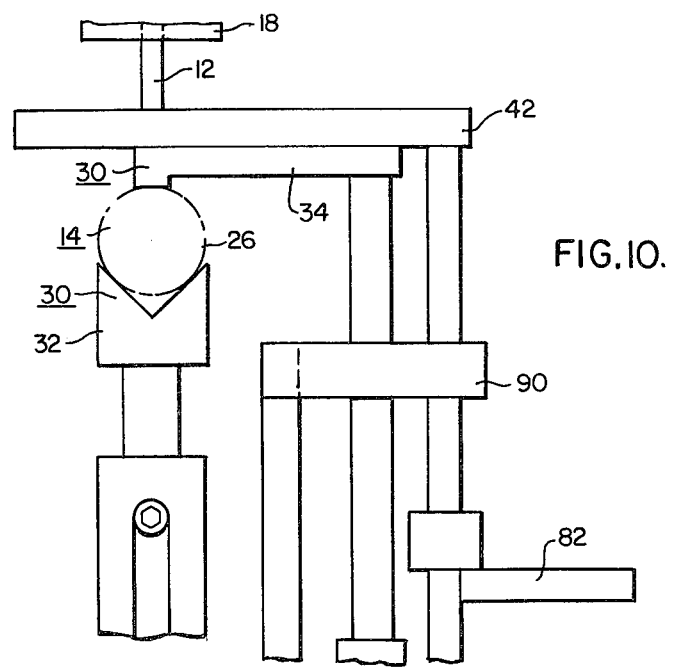
FIG. 10 is an operational schematic plan view showing the jaws clamping the arc tube and the burner in position to heat the tip area.
Figure 15:
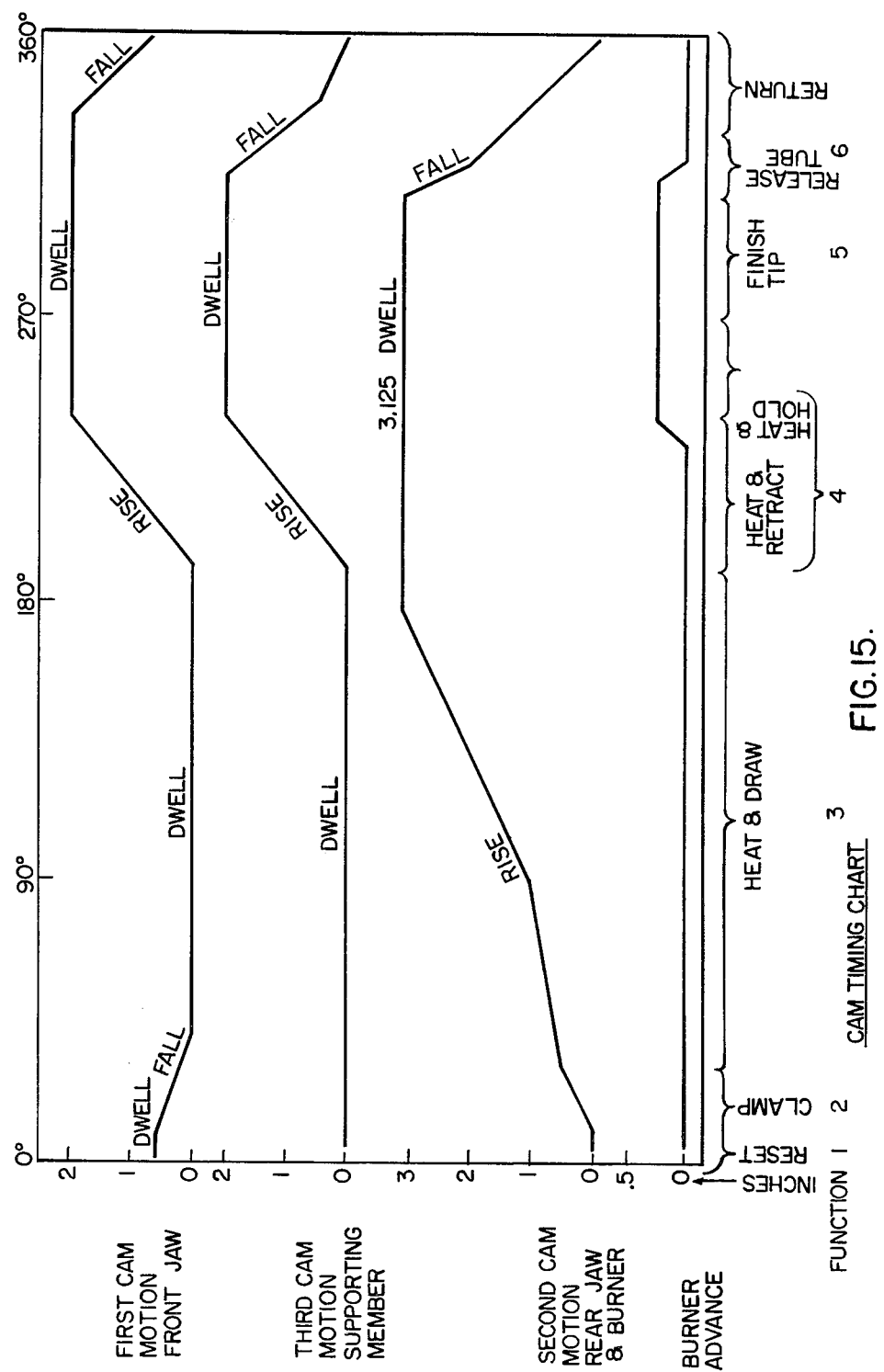

An adjustable stop means 80 comprising stationary stop 82, movable stop 83, cylinder clamp 84, back member 85, third spring 86, and adjustment nut 88, stops the burner 42 a predetermined distance such as 2.5 millimeters from the rear jaws 34 to effect the complete severing of the tip portion 48 and to effect a fire polishing thereof. It has been found that providing this separation of 2.5 millimeters between the burner and rear jaws permits the sharp point that forms on the tip portion 48 to fold up upon itself by surface tension to provide a good fire polishing for the tip portion. Referring to FIGS. 9-15, the tipping-off apparatus 10 functions as follows:

As shown in FIG. 9, the jaw means 30 and the burner means 42 are in the reset position and arc tube 14 has just been indexed to the tipping-off station "T". Support member 90 provides support for the rear jaws 34 and burners 42 during the tipping-off operation. The support 90 is moved by a third cam 92 engageable with cam follower 94 shown in FIG. 3. Referring to FIG. 15 for the cam timing sequence, in the next position shown in FIG. 10 the front jaw 32 and the rear jaw 34 move in to clamp the tubulated body 26 and the burner follows the rear jaw 34. The front jaw preloads approximately 1 ounce (28.4 grams) against the tubulated body 26 while the rear jaw clamps the tubulated body 26 with approximately 2½ ounces (71.0 grams) of pulling force. Utilizing the present invention, the preset attitude of the burner relative to the rear jaw at this point in the sequence provides that, regardless of diameter variations over the design range, the proper area of the exhaust tubulation is being heated. In addition, the tipping-off apparatus of the present invention may accept arc tubes from the 100 watt to 1000 watt size without requiring a change in equipment. In the next position shown in FIG. 11, the spring loading on the rear jaw 34 overcomes the spring loading of the front jaw 32 when the quartz becomes viscous. This allows a controlled draw, providing thickness in the area of the tip portion 48. In the next position shown in FIG. 12 the jaws 30, the burner 42 along with supporting member 90, move back together approximately 5 centimeters, retracting the tubulated body 26 and pulling from the tip portion 48 causing the viscous quartz to string out as shown. In the next position shown in FIG. 13 the jaws 30 and supporting member 90 continue moving back while the burner 42 is prevented from moving back by stop 82 which abuts against adjustable set screw 91, shown in FIG. 3, leaving a 2.5 millimeter spacing between the rear jaw 34 and the burner 42. As the burner is caused to separate from the rear jaw 34 it cuts off the fine quartz string and fire polishes the finished tip portion 48 smooth. In the final position shown in FIG. 14 the front jaw 32 and the supporting member 90 remain in the same position and the burner 42 and rear jaw 34 move back toward the holding member 18, releasing the tipped-off arc tube 14 which falls into a chute (not shown). The mechanism then returns to the reset position ready to accept another arc tube.

The present invention provides a reliable hermetic quartz seal close to the arc tube wall in 3.6 seconds or less and is capable of handling an arc tube diameter in the range from 10 to 40 millimeters with 4 millimeters diameter exhaust tubing having a 1 millimeter wall thickness, without the necessity of change-over tooling with a minimum of adjustment and accomplishes this while holding the arc tube body in a vertical orientation. Thus, this invention is very compatible with the present state of the art processes which operate at rates from 500 to 700 units per hour with the arc tube held in a vertical orientation.

I claim:

1. Tipping-off apparatus for hermetically sealing the exhaust tubulation of a dosed and otherwise processed arc tube for a high-intensity-discharge device, said tipping-off apparatus comprising a portion of a fabricating apparatus for said arc tubes, said fabricating apparatus including a plurality of arc tube holding members each mounted about the peripheral portion of a turret member and being sequentially indexable in a stop-and-go fashion to and from a plurality of operating stations located about the periphery of said turret, said arc tube just prior to being tipped-off comprising an elongated, tubulated body having electrodes operatively positioned proximate the sealed ends thereof with a predetermined discharge-sustaining filling contained within said arc tube body, said arc tube body having an elongated exhaust tubulation projecting laterally therefrom and opening into the interior thereof, said tipping-off apparatus positioned at one of said operating stations and each of said arc tubes upon being indexed into said tipping-off operating station being retained on said turret by its exhaust tubulation with the arc tube body retained in a vertical orientation and with the atmosphere within said arc tube and said tubulation being a small charge of inert ionizable starting gas, said tipping-off apparatus comprising spring-loaded jaw means movable into retaining position on opposite sides of said arc tube, the spring loading on each of said jaw means being slightly different so that absent the retention of said arc tube by its exhaust tubulation, said arc tube would be moved a predetermined distance by said jaw means;

burner means movable into position about the tubulation of said arc tube and operable to heat said tubulation to a softened status at a location proximate the body of said arc tube, and when said tubulation has been sufficiently softened by the heating from said burner means, the spring loading on said jaw means acts to move said arc tube a predetermined distance with respect to said retained tubulation to form a hermetic tip portion of said tubulation;

timing means for controlling the movement of said jaw means and said burner means upon said arc tube being indexed to said tipping-off station;

jaw and burner moving means operable by said timing means for moving said jaw means and said burner means from the remainder of said retained exhaust tubulation to effect the complete severing of said retained exhaust tubulation from said hermetic tip portion, and said burner means continuing to heat the severed tip portion of said tubulation proximate said arc tube body to effect a fire polishing thereof and then operable to open said jaw means to release the now sealed arc tube.

2. The apparatus of claim 1, wherein said spring-loaded jaw means comprise a front jaw member engageable with said arc tube on the side opposite said exhaust tubulation, a rear jaw means engageable with said arc tube opposite said front jaw member, first spring means engageable with said front jaw member for providing a predetermined force toward said rear jaw means, and second spring means engageable with said rear jaw means for providing a predetermined greater force than the force of said first spring means toward said front jaw means.

3. The apparatus of claim 2, wherein said jaw and burner moving means comprises a rotatable camshaft operable to rotate one revolution, with a rotation of said camshaft being initiated when said arc tube is indexed to said tipping-off station, driving means connecting to one end of said camshaft comprising a motor means for driving said camshaft at a predetermined speed, a one-revolution clutch means comprising a clutch wheel mounted for rotation on said camshaft and operable to permit said camshaft to turn one revolution between each index of said turret and a solenoid activated trip means engageable with said clutch wheel, said trip means normally preventing the rotation of said clutch wheel until said trip means is energized by said arc tube being indexed to said tipping-off station.

4. The apparatus of claim 3, wherein said timing means comprises first cam means comprising a first cam mounted for rotation on said camshaft and a first cam follower engaging said first cam and operable to move said front jaw means inwardly and outwardly from the axis of said turret in predetermined sequence, second cam means comprising a second cam mounted for rotation on said camshaft and a second cam follower engaging said cam and operable to move said rear jaw means inwardly and outwardly from the axis of said turret in a predetermined sequence.

5. The apparatus of claim 3, wherein said jaw and burner means further comprise an adjustable stop means for stopping said burner means a predetermined distance from said rear jaw means to effect said complete severing of said tip portion and to effect a fire polishing thereof.

* * * * *